(12) United States Patent
Tani (10) Patent No.: US 9,097,894 B2
(45) Date of Patent: Aug. 4, 2015

(54) OPTICAL DEFLECTOR INCLUDING FOUR COUPLING BARS BETWEEN SUPPORT BODY AND FRAME

(71) Applicant: STANLEY ELECTRIC CO., LTD., Meguro-ku, Tokyo (JP)

(72) Inventor: Masanao Tani, Yamato-shi (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 176 days.

(21) Appl. No.: 13/846,518

(22) Filed: Mar. 18, 2013

(65) Prior Publication Data

US 2013/0250390 A1    Sep. 26, 2013

(30) Foreign Application Priority Data

Mar. 23, 2012    (JP) .................. 2012-067984

(51) Int. Cl.
*G02B 26/08*    (2006.01)

(52) U.S. Cl.
CPC ........ *G02B 26/0816* (2013.01); *G02B 26/0858* (2013.01)

(58) Field of Classification Search
CPC ........... G02B 26/0858; G02B 26/0841; G02B 26/085; G02B 26/101; G02B 26/105; G02B 26/0833; G02B 26/0816; G02B 27/0176; G02B 27/103; G02B 6/3518; G02B 6/3584; G02B 6/359; B81B 7/02; B81B 3/0083; B81B 2201/04; B81B 2201/045; B81B 2201/047
USPC ................ 359/198.1, 199.1, 208, 291, 223.1, 359/224.1, 224.2, 225.1, 226.1, 226.2, 877, 359/200.8; 385/18; 369/44.13; 250/234; 347/260
See application file for complete search history.

(56) References Cited

U.S. PATENT DOCUMENTS

| | | | | |
|---|---|---|---|---|
| 3,840,293 A | * | 10/1974 | Fine et al. ................... | 359/224.1 |
| 4,074,312 A | * | 2/1978 | van Rosmalen ............ | 369/44.13 |
| 4,865,436 A | * | 9/1989 | Ahonen et al. ............. | 359/224.1 |
| 5,102,214 A | * | 4/1992 | Steele et al. ................ | 359/223.1 |
| 5,920,417 A | * | 7/1999 | Johnson ...................... | 359/223.1 |
| 6,285,489 B1 | * | 9/2001 | Helsel et al. ................ | 359/291 |
| 6,535,325 B2 | * | 3/2003 | Helsel et al. ................ | 359/291 |
| 6,625,341 B1 | * | 9/2003 | Novotny ........................ | 385/18 |
| 6,912,078 B2 | * | 6/2005 | Kudrle et al. .............. | 359/224.1 |

(Continued)

FOREIGN PATENT DOCUMENTS

JP    2008-020701 A    1/2008

*Primary Examiner* — Scott J Sugarman
*Assistant Examiner* — Collin X Beatty
(74) *Attorney, Agent, or Firm* — Holtz, Holtz, Goodman & Chick PC (57) ABSTRACT

In an optical deflector including a mirror, a movable ring-shaped frame surrounding the mirror, a pair of torsion bars connected between the mirror and the movable ring-shaped frame and oppositely arranged along a rocking direction of the mirror, a support body surrounding the movable ring-shaped frame, and piezoelectric actuators for rocking the mirror through the torsion bars along the rocking direction, first, second, third and fourth coupling bars are connected between the support body and the movable ring-shaped frame. The first and third coupling bars are oppositely arranged along a first direction obtained by inclining the rocking direction by a first predetermined angle between +30° and +45°, and the second and fourth coupling bars are oppositely arranged along a second direction obtained by inclining the rocking direction by a second predetermined angle between −30° and −60°.

4 Claims, 11 Drawing Sheets

(56) References Cited

U.S. PATENT DOCUMENTS

| | | | |
|---|---|---|---|
| 7,054,053 B2 * | 5/2006 | Nishioka | 359/291 |
| 7,405,854 B2 * | 7/2008 | Desai et al. | 359/224.1 |
| 7,442,918 B2 * | 10/2008 | Sprague et al. | 250/234 |
| 7,990,595 B1 * | 8/2011 | Chou et al. | 359/198.1 |
| 8,218,214 B2 * | 7/2012 | Wang et al. | 359/199.1 |
| 8,325,405 B2 * | 12/2012 | Wang et al. | 359/199.1 |
| 8,873,128 B2 * | 10/2014 | Conrad et al. | 359/290 |
| 2003/0053232 A1 * | 3/2003 | Dalziel | 359/877 |
| 2003/0227538 A1 * | 12/2003 | Fujii et al. | 347/260 |
| 2007/0047046 A1 * | 3/2007 | Ji | 359/208 |

\* cited by examiner

OPTICAL DEFLECTOR INCLUDING FOUR COUPLING BARS BETWEEN SUPPORT BODY AND FRAME

This application claims the priority benefit under 35 U.S.C. §119 to Japanese Patent Application No. JP2012-067984 filed on Mar. 23, 2012, which disclosure is hereby incorporated in its entirety by reference.

BACKGROUND

1. Field

The presently disclosed subject matter relates to an optical deflector used in a projector, a headlamp and the like.

2. Description of the Related Art

Figure 1A:
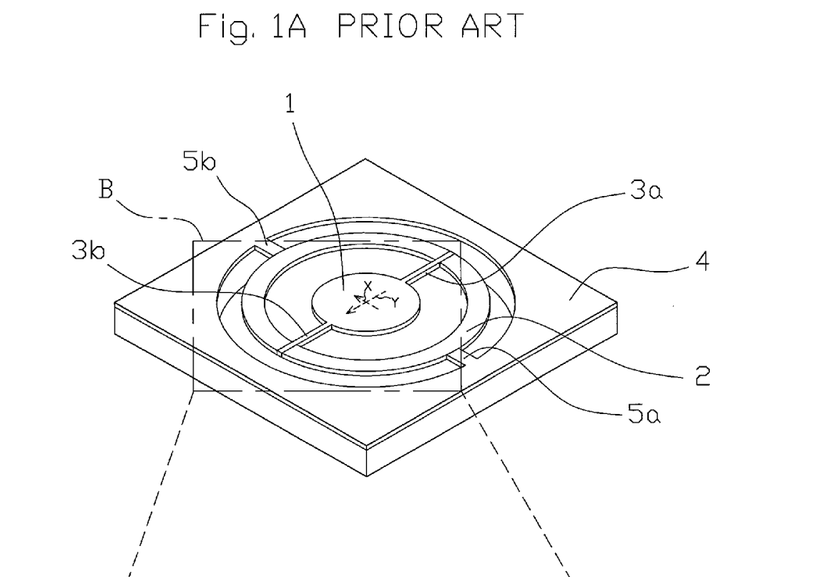
FIG. 1A is a perspective view illustrating a prior art one-dimensional optical deflector.
Figure 1B:
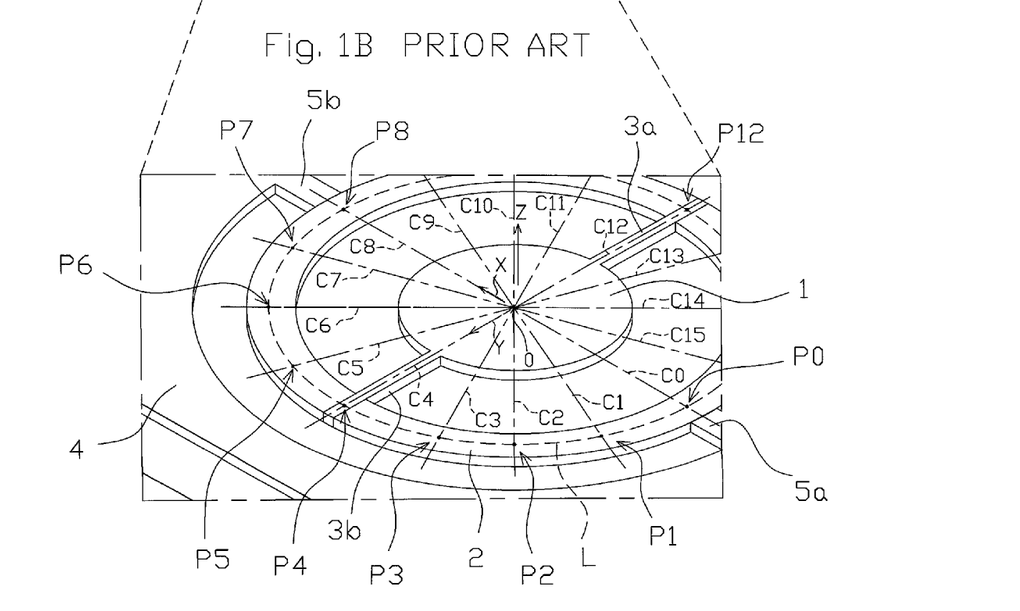
FIG. 1B is a partial enlargement of the optical deflector of FIG. 1A enclosed by a dotted line B in FIG. 1A.

FIG. 1A is a perspective view illustrating a prior art one-dimensional optical deflector, and FIG. 1B is a partial enlargement of the optical deflector of FIG. 1A enclosed by a dotted line B in FIG. 1A (see: FIG. 5 of JP2008-20701A).

As illustrated in FIGS. 1A and 1B, the prior art one-dimensional optical deflector is constructed by a circular mirror 1, a movable ring-shaped frame 2 surrounding the mirror 1 with a slit, a pair of torsion bars 3a and 3b arranged along a Y-axis having ends coupled to the inner circumference of the movable ring-shaped frame 2 and other ends coupled to the circumference of the mirror 1, a support body 4 surrounding the movable ring-shaped frame 2 with a slit, and a pair of coupling bars 5a and 5b arranged along an X-axis perpendicular to the Y-axis having ends coupled to the inner circumference of the support body 4 and other ends coupled to the outer circumference of the movable ring-shaped frame 2.

Piezoelectric actuators (not shown) formed on the entire movable ring-shaped frame 2 associated with the torsion bars 3a and 3b are of a resonance type. That is, in a resonance state, when the rocking frequency "f" of the piezoelectric actuators is close to the natural frequency of a mechanically-vibrating system of the mirror 1, the deflection angle of the mirror 1 with respect to the Y-axis can be increased.

In the above-mentioned resonance state, the inventor found that, portions of the movable ring-shaped frame 2 where the torsion bars 3a and 3b and the coupling bars 5a and 5b are coupled form loops having maximum amplitudes of a resonant vibration, while portions of the movable ring-shaped frame 2 having 45°-angled diameter directions with respect to a diameter line between the torsion bars 3a and 3b and a diameter line between the coupling bars 5a and 5b form nodes having essentially zero amplitudes of the resonant vibration. Thus, the loop portions of the movable ring-shaped frame 2 where the coupling bars 5a and 5b are located would degrade the endurance of the coupling bars 5a and 5b.

Particularly, in order to suppress the deformation of the mirror 1, a reinforcement would be attached to the back surface of the mirror 1, which would substantially increase the inertial moment thereof. In this case, the endurance of the coupling bars 5a and 5b would further be degraded.

The loop portions and node portions of the movable ring-shaped frame 2 are discussed in more detail below.

In FIG. 1B, radial axes C0, C1, . . . , C8, . . . , C15 are defined at intervals 22.5° centered at a point "0". Also, a circumferential line L is defined at a center line between the outer and inner circumferences of the movable ring-shaped frame 2. Further, P0, P1, . . . , P8, . . . , P15 are defined as locations at intersections between the circumferential line L and the radial axes C0, C1, . . . , C8, . . . , C15, respectively.

The X-axis is defined as the direction of the radial axis C8, and the Y-axis is defined as the direction of the radial axis C4. In this case, the Y-axis is shifted from the rocking direction of the mirror 1 by a half thickness of the mirror 1; however, since this half thickness is very thin, the Y-axis is substantially the same as the rocking direction of the mirror 1. Also, a Z-axis is defined as a direction perpendicular to the X-axis and the Y-axis.

Figure 2:
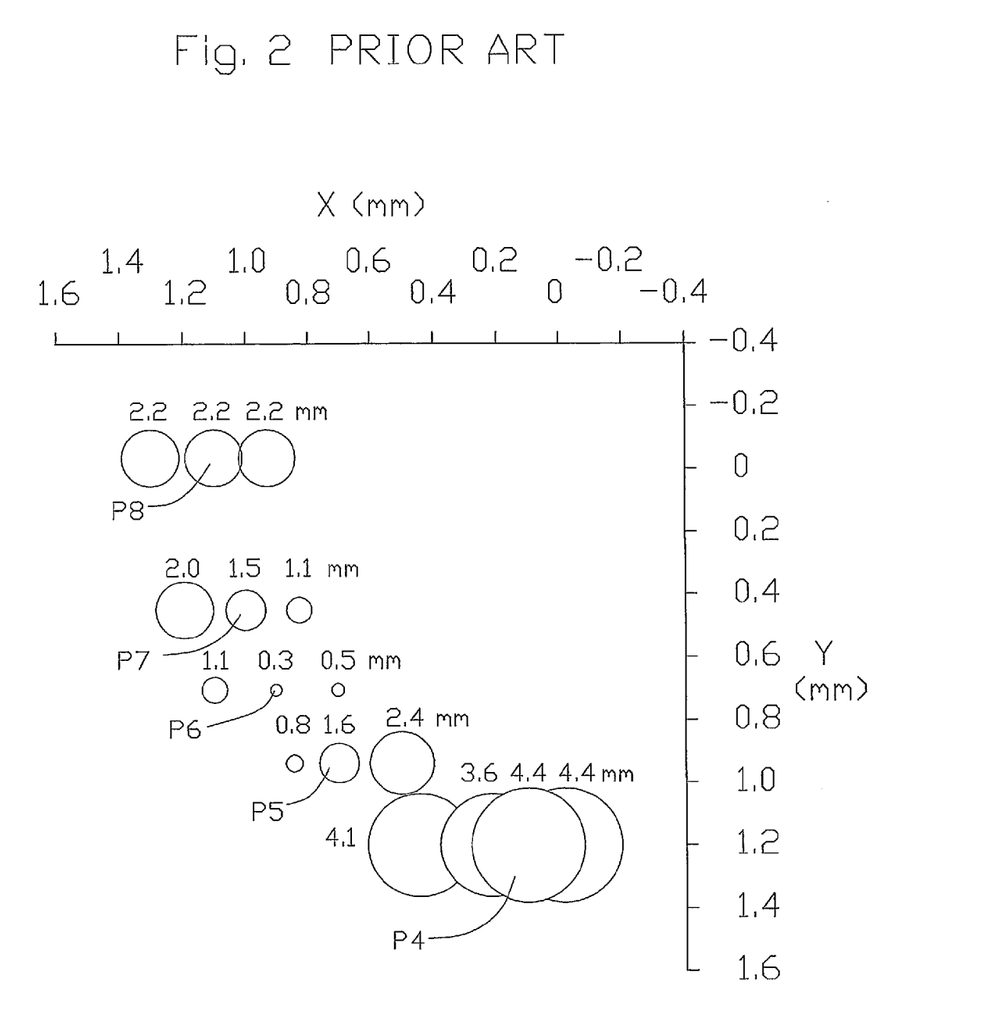
FIG. 2 is a graph showing the amplitudes of the locations of FIG. 1B.

In FIG. 2, which illustrates the amplitudes at the locations P4, P5, P6, P7 and P8 along the Z-axis of FIG. 1B in a resonant state, three or four amplitudes at three or four X-coordinate values and at one Y-coordinate value were measured. As illustrated in FIG. 2, the amplitude at the location P4 was about 4.4 mm, the amplitude at the location P5 was about 1.6 mm, the amplitude at the location P6 was about 0.3 mm, the amplitude at the location P7 was about 1.5 mm, and the amplitude at the location P8 was about 2.2 mm. Therefore, the amplitude at the location P6 was minimum, while the amplitude at the location P4 was maximum. Also, the amplitudes at the locations P5 and P7 were medium.

The amplitude at the location P8 is smaller than the amplitude at the location P4, because the coupling bar 5b is located at the location P8 to suppress the vibration of the portion of the movable ring-shaped frame 2 at the location P8. That is, if no coupling bar is present at the location P8, the amplitude at the location P8 is considered to be the same as the amplitude at the location P4, i.e., larger than 2.2 mm.

Figure 3:
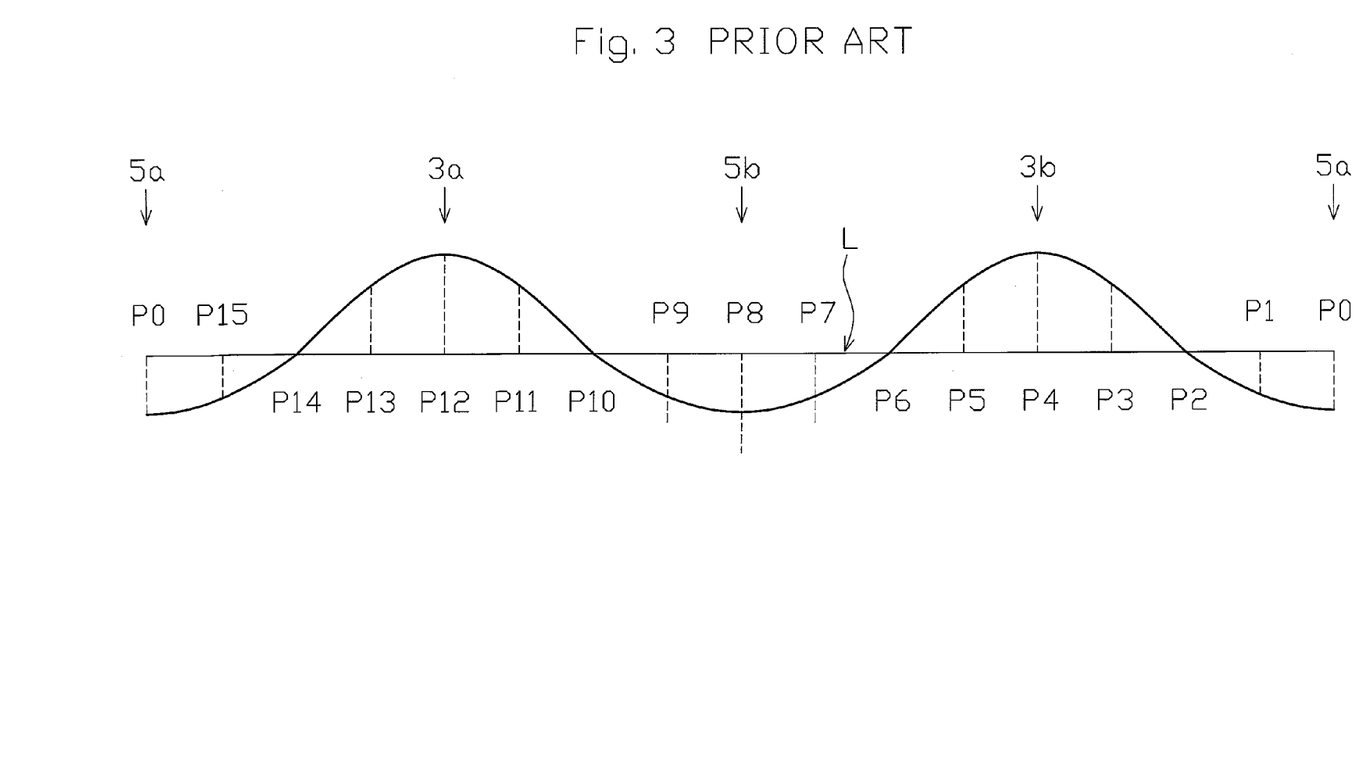
FIG. 3 is a graph showing the amplitudes at the circumferential line of the movable ring-shaped frame of FIG. 1B.

As is understood from FIG. 2, the amplitudes at the locations P0, P1, . . . , P8, . . . , P15 of the circumferential line L in a resonant state can be as shown in FIG. 3. Thus, while the locations P2 and P6 are at nodes of a resonant vibration, the locations P0 and P8 of the coupling bars 5a and 5b, respectively, are at loops of the resonant vibration, which would degrade the endurance of the coupling bars 5a and 5b.

SUMMARY

The presently disclosed subject matter seeks to solve one or more of the above-described problem.

According to the presently disclosed subject matter, in an optical deflector including a mirror, a movable ring-shaped frame surrounding the mirror, a pair of torsion bars connected between the mirror and the movable ring-shaped frame and oppositely arranged along a rocking direction of the mirror, a support body surrounding the movable ring-shaped frame, and piezoelectric actuators for rocking the mirror through the torsion bars along the rocking direction, first, second, third and fourth coupling bars are connected between the support body and the movable ring-shaped frame. The first and third coupling bars are oppositely arranged along a first direction obtained by inclining the rocking direction by a first predetermined angle between +30° and +45°, and the second and fourth coupling bars are oppositely arranged along a second direction obtained by inclining the rocking direction by a second predetermined angle between −30° and −60°.

According to the presently disclosed subject matter, since the first and third coupling bars are arranged along the first direction corresponding to nodes of a resonant vibration and the second and fourth coupling bars are arranged along the second direction corresponding to other nodes of the resonant vibration, the endurance of the coupling bars can be enhanced.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein.

DETAILED DESCRIPTION OF EXEMPLARY EMBODIMENTS

Figure 4:
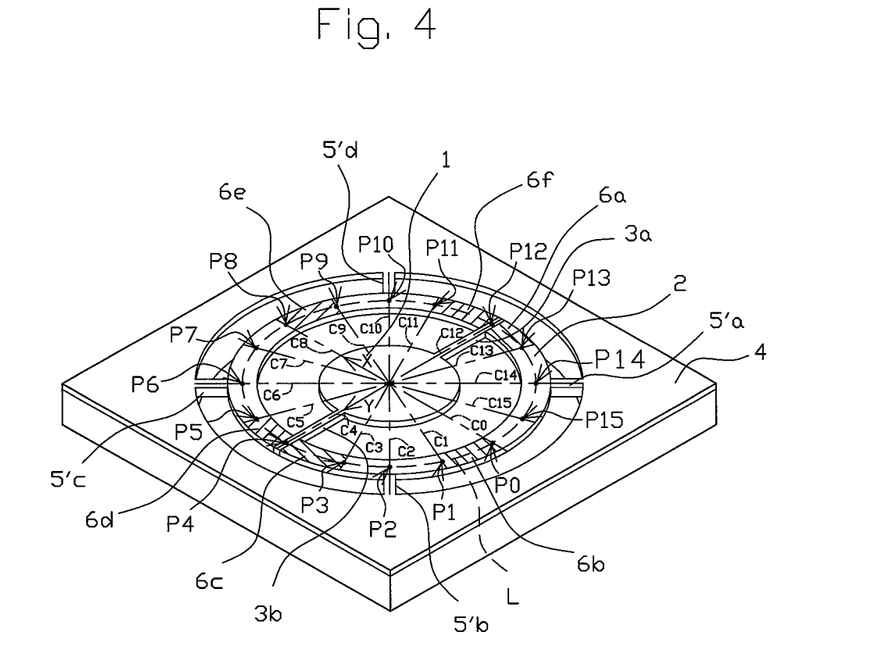
FIG. 4 is a perspective view illustrating a first embodiment of the optical deflector according to the presently disclosed subject matter.

In FIG. 4, which illustrates a first embodiment of the optical deflector according to the presently disclosed subject matter, the two coupling bars 5a and 5b of FIGS. 1A and 1B are replaced by four coupling bars 5'a, 5'b, 5'c and 5'd.

Figure 5:
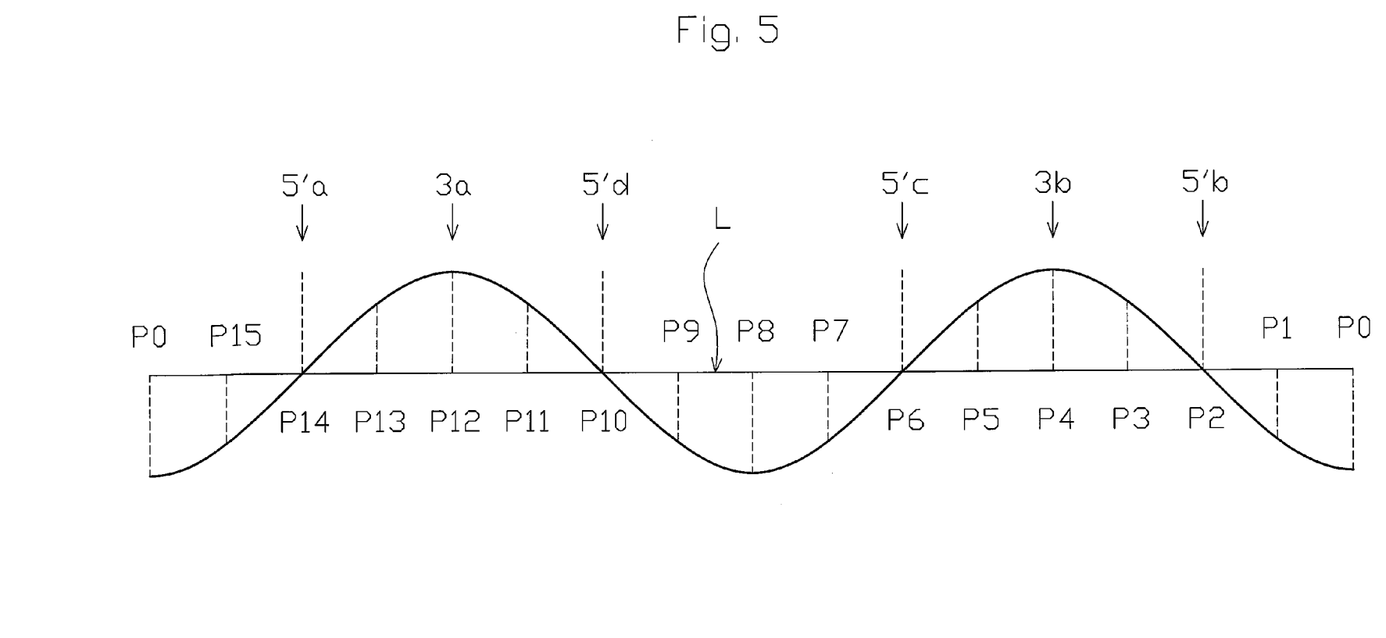
FIG. 5 is a graph showing the amplitudes at the circumferential line of the movable ring-shaped frame of FIG. 4.

The coupling bars 5'a, 5'b, 5'c and 5'd are located at the locations P14, P2, P6 and P10, respectively. That is, the coupling bars 5'a, 5'b, 5'c and 5'd are located along ±45°-angled diameter directions with respect to the Y-axis, i.e., the rocking direction of the mirror 1. Therefore, the coupling bars 5'a, 5'b, 5'c and 5'd are located at the nodes of a resonant vibration as illustrated in FIG. 5. As a result, even when the movable ring-shaped frame 2 is rocked by piezoelectric actuators 6a, 6b, . . . , 6f provided on the movable ring-shaped frame 2, the coupling bars 5'a, 5'b, 5'c and 5'd would hardly vibrate, so that the endurance of the coupling bars 5'a, 5'b, 5'c and 5'd would be enhanced.

Also, the four coupling bars 5'a, 5'b, 5'c and 5'd rather than the two coupling bars 5a and 5b of FIG. 1 could stably support the movable ring-shaped frame 2.

Further, since the torsion bars 3a and 3b are located at the loops of a resonant vibration in the same way as in the prior art, the rocking operation of the mirror 1 with respect to the Y-axis would be enhanced.

The piezoelectric actuators are not provided on the entire movable ring-shaped frame 2. That is, the piezoelectric actuators 6a and 6f are provided on the movable ring-shaped frame 2 to sandwich the torsion bar 3a, and the piezoelectric actuators 6c and 6d are provided on the movable ring-shaped frame 2 to sandwich the torsion bar 3b. Also, the piezoelectric actuators 6b and 6e are provided on the movable ring-shaped frame 2 opposite to each other with respect to the Y-axis, i.e., the rocking direction of the mirror 1. Further, the circumferential size of each of the piezoelectric actuators 6b and 6e are twice that of each of the piezoelectric actuators 6a, 6c, 6d and 6f.

Thus, since the piezoelectric actuators 6a, 6b, 6c, 6d, 6e and 6f are provided for the loops of the resonant vibration as illustrated in FIG. 5, with no piezoelectric actuators provided for the nodes of the resonant vibration as illustrated in FIG. 5, an effective rocking operation of the mirror 1 can be carried out, while the flexing amounts at the portions of the movable ring-shaped frame 2 for the nodes of the resonant vibration can efficiently be suppressed.

Figure 6A:
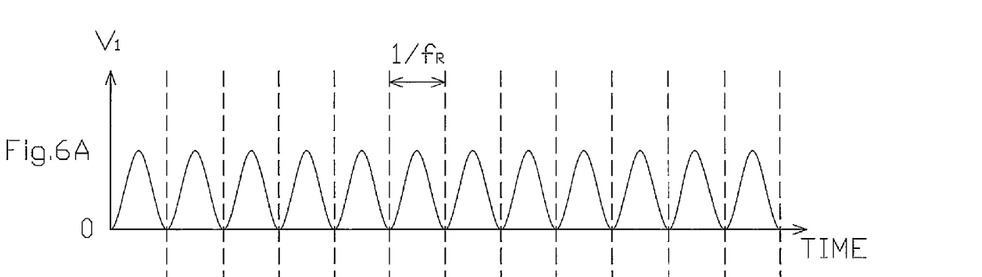
FIGS. 6A and 6B are timing diagrams of sinusoidal-wave voltages applied to the piezoelectric actuators of FIG. 4.
Figure 6B:
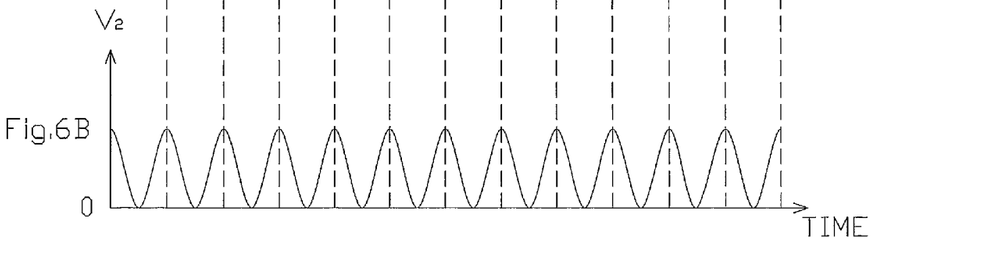

The piezoelectric actuators 6a, 6b and 6c are driven by a sinusoidal-wave voltage $V_1$ whose frequency $f_R$ is a resonant frequency as illustrated in FIG. 6A, and the piezoelectric actuators 6d, 6e and 6f are driven by a sinusoidal-wave voltage $V_2$ as illustrated in FIG. 6B which is opposite in phase to the sinusoidal-wave voltage $V_1$, thereby to rock the mirror 1 with respect to the Y-axis.

The structure of each element of the optical deflector of FIG. 4 is explained next with reference to FIG. 7 which is a cross-sectional view of the optical deflector of FIG. 4.

Figure 7:
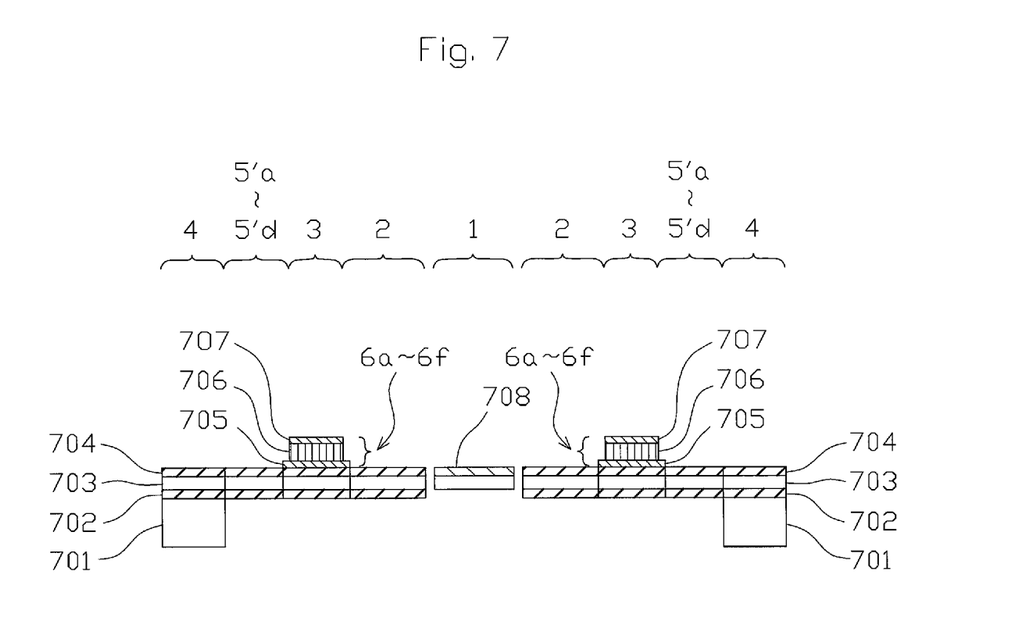
FIG. 7 is a cross-sectional view of the optical deflector of FIG. 4.

In FIG. 7, a monocrystalline silicon support layer 701, an intermediate silicon dioxide layer 702 and a monocrystalline silicon active layer 703 are formed by a silicon-on-insulator (SOI) substrate. Also, reference numeral 704 designates a silicon dioxide layer, 705 designates a lower electrode layer of a double layer made of Ti, $TiO_2$ or $TiO_x$ (0<x<2) and Pt, $LaNiO_2$ or $SrRuO_2$, 706 designates a lead titanate zirconate (PZT) layer, 707 designates an upper electrode layer made of Pt, Au or the like, and 708 designates an about 100 to 500 nm metal layer made of Al, Ag, Au, Pt or the like.

The mirror 1 is constructed by the monocrystalline silicon active layer 703 serving as a vibration plate and the metal layer 708 serving as a reflector.

The movable ring-shaped frame 2 is constructed by the intermediate silicon layer 702, the monocrystalline silicon active layer 703 and the silicon dioxide layer 704.

Each of the piezoelectric actuators 6a, 6b, 6c, 6d, 6e and 6f is constructed by the lower electrode layer 705, the PZT layer 706 and the upper electrode layer 707.

The support body 4 is constructed by the monocrystalline silicon layer 701, the intermediate silicon layer 702, the monocrystalline silicon active layer 703 and the silicon dioxide layer 704.

The structure of the optical deflector as illustrated in FIG. 7 can be manufactured by the semiconductor manufacturing technology and the micro electro mechanical systems (MEMS) technology.

Figure 8:
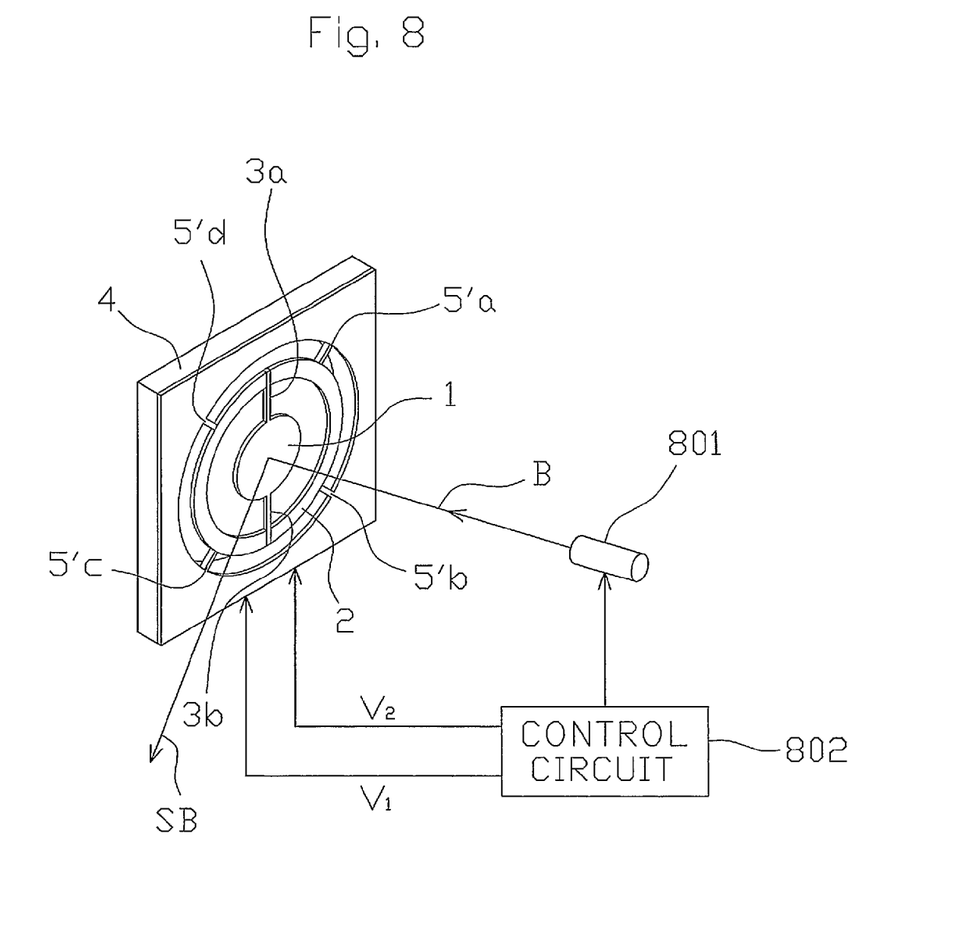
FIG. 8 is a view illustrating a light scanning system including the optical deflector of FIG. 4.

The optical deflector of FIG. 4 is applied to a light scanning system as illustrated in FIG. 8. In FIG. 8, a light source 801 emits a light beam B and transmits it to the mirror 1 of the optical deflector of FIG. 4. A control circuit 802 controls the light source 801, so that the control circuit 802 turns ON and OFF the light source 801, as occasion demands. Also, the control circuit 802 generates the sinusoidal-wave voltages V1 and V2 as illustrated in FIGS. 6A and 6B, and transmits them to the piezoelectric actuators 6a, 6b and 6c, and the piezoelectric actuators 6d, 6e and 6f. For example, the control circuit 802 turns ON the light source 1 for a half period of the sinusoidal-wave voltage V1 and turns OFF the light source 1 for the other half period of the sinusoidal-wave voltage V1. As a result, the light beam B is reflected by the mirror 1 to emit a scanning light beam SB. Note that the control circuit 802 is constructed by a microcomputer including a central processing unit (CPU), a read-only memory (ROM), a random access memory (RAM) and the like.

Figure 9A:
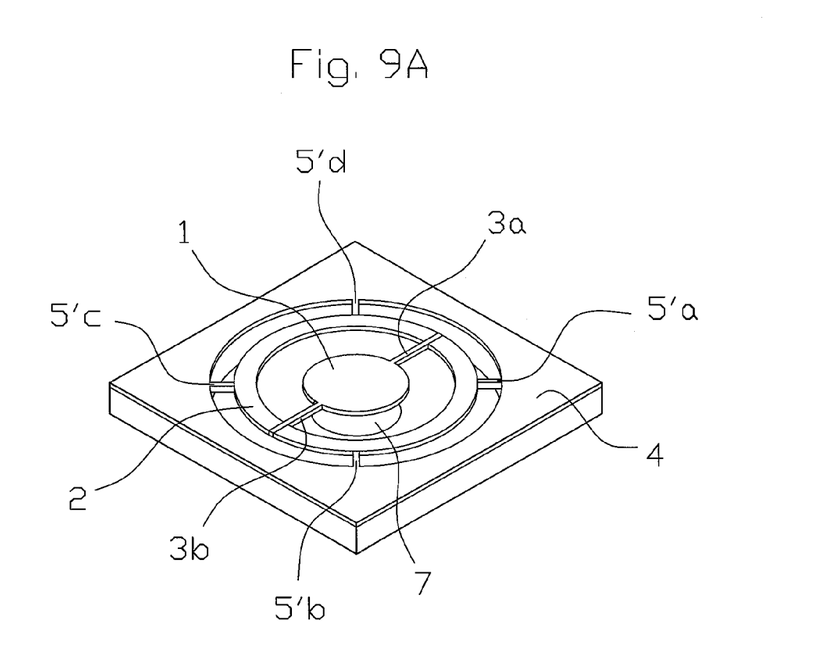
FIGS. 9A and 9B are perspective front and back views, respectively, illustrating a second embodiment of the optical deflector according to the presently disclosed subject matter.
Figure 9B:
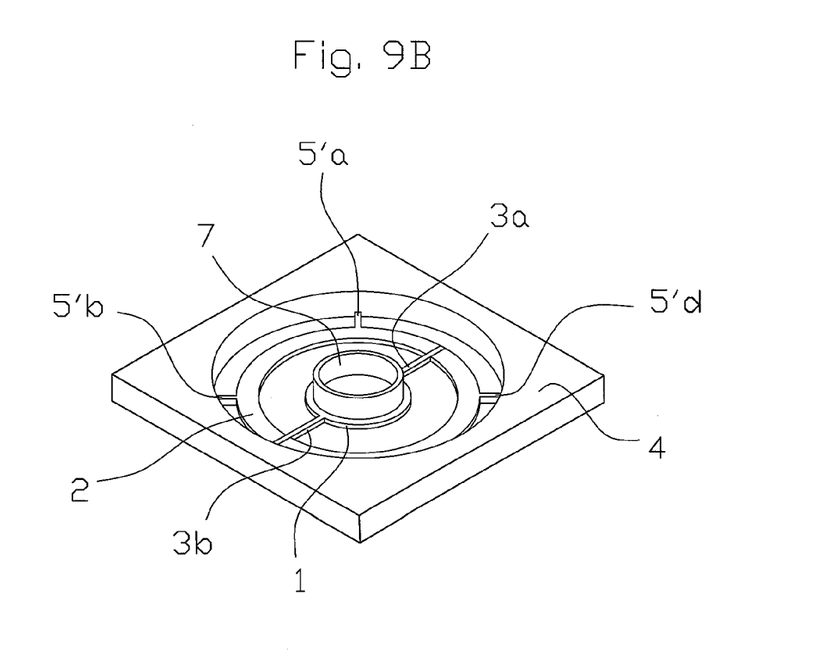
Figure 10:
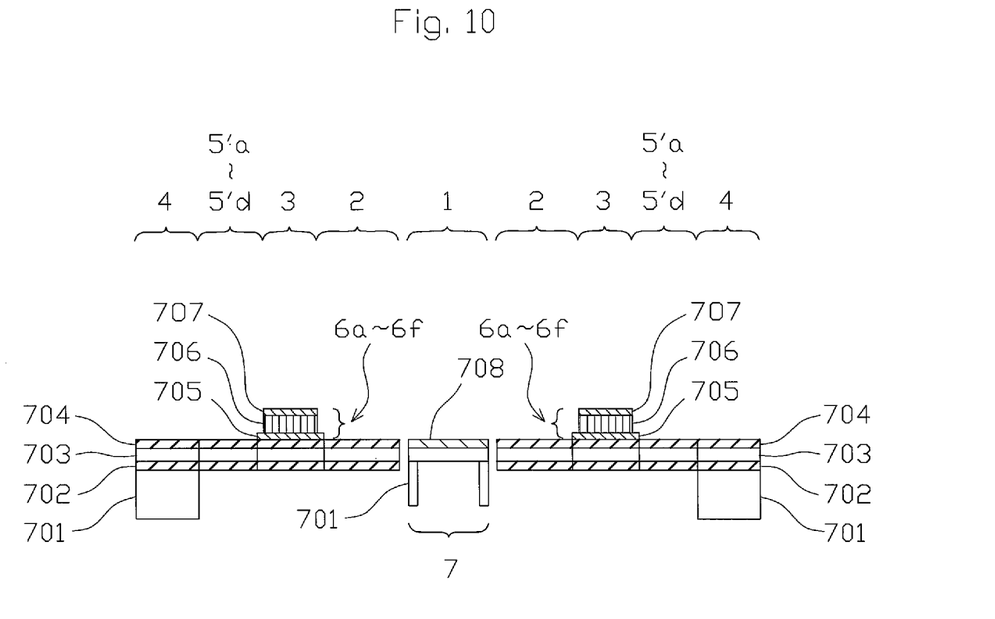
FIG. 10 is a cross-sectional view of the optical deflector of FIG. 4.

In FIGS. 9A and 9B, which illustrate a second embodiment of the optical deflector according to the presently disclosed subject matter, a ring-shaped reinforcement 7 is attached to the back surface of the mirror 1 of FIG. 4 in order to enhance the rigidity of the mirror 1. As illustrated in FIG. 10, the ring-shaped reinforcement 7 is formed by the monocrystalline silicon active layer 701. As a result, even when the rocking operation of the mirror 1 is carried out at a high speed or the rocking angle of the mirror 1 is increased, the mirror 1 would not be distorted to suppress the fluctuation of the direction of the scanning light beam SB of FIG. 8.

Figure 11:
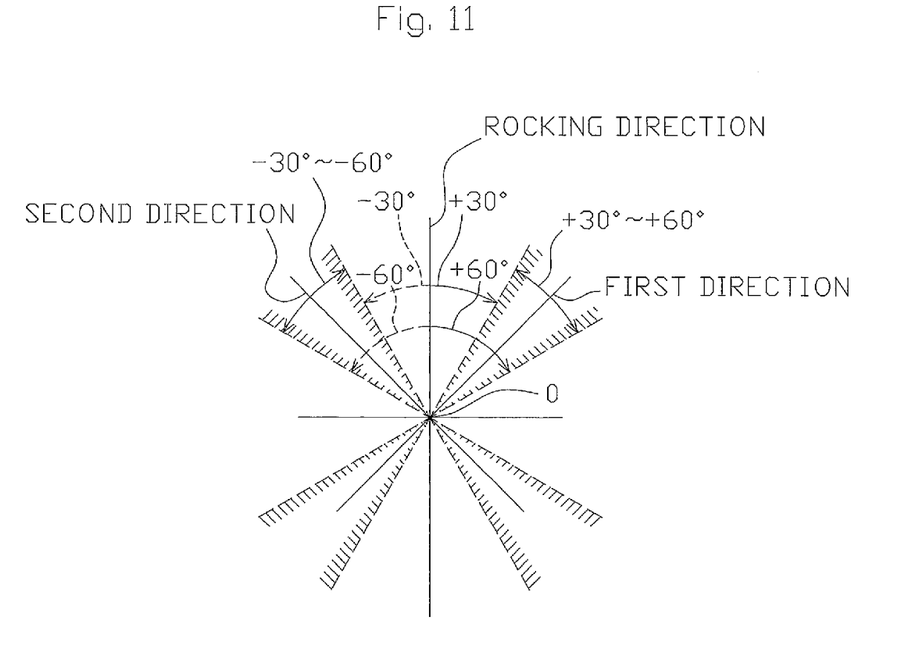
FIG. 11 is a view for explaining the directions of the coupling bars of FIG. 4.

In the above-described embodiments, the mirror 1 is circular; however, the mirror 1 can be an ellipse. Also, the coupling bars 5'a and 5'c are arranged along a +45°-angled direction with respect to the rocking direction of the mirror 1, and the coupling bars 5'b and 5'd are arranged along a −45°-angled direction with respect to the rocking direction of the mirror 1. However, as illustrated in FIG. 11, the coupling bars 5'a and 5'c can be arranged along a first predetermined direction which is +30° to +60°-angled with respect to the rocking direction, and the coupling bars 5'b and 5'd can be arranged along a second predetermined direction which is −30° to −60°-angled with respect to the rocking direction.

Further, since a two-dimensional optical deflector conventionally includes a one-dimensional optical deflector, the optical deflector according to the presently disclosed subject matter can be applied to such a two-dimensional optical deflector.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
   a mirror;
   a movable ring-shaped frame surrounding said mirror;
   a pair of torsion bars connected between said mirror and said movable ring-shaped frame, said torsion bars being oppositely arranged along a rocking axis of said mirror;
   a support body surrounding said movable ring-shaped frame;
   first, second, third and fourth coupling bars connected between said support body and said movable ring-shaped frame, said first and third coupling bars being oppositely arranged along a first direction which is offset by a first predetermined angle between +30° and +60° with respect to said rocking axis, said second and fourth coupling bars being oppositely arranged along a second direction which is offset by a second predetermined angle between −30° and −60° with respect to said rocking axis; and
   piezoelectric actuators, formed on said movable ring-shaped frame, for rocking said mirror through said torsion bars along said rocking axis.

2. The optical deflector as set forth in claim 1, wherein said first predetermined angle is +45°, and said second predetermined angle is −45°.

3. The optical deflector as set forth in claim 1, wherein said piezoelectric actuators are not provided on portions of said movable ring-shaped frame where said first, second, third and fourth coupling bars are connected.

4. The optical deflector as set forth in claim 1, further comprising a ring-shaped reinforcement attached to a back surface of said mirror.

* * * * *